Feb. 23, 1960    M. KERPCHAR    2,926,294
VARIABLY DAMPED INSTRUMENT LANDING SERVOSYSTEM
Filed June 5, 1953
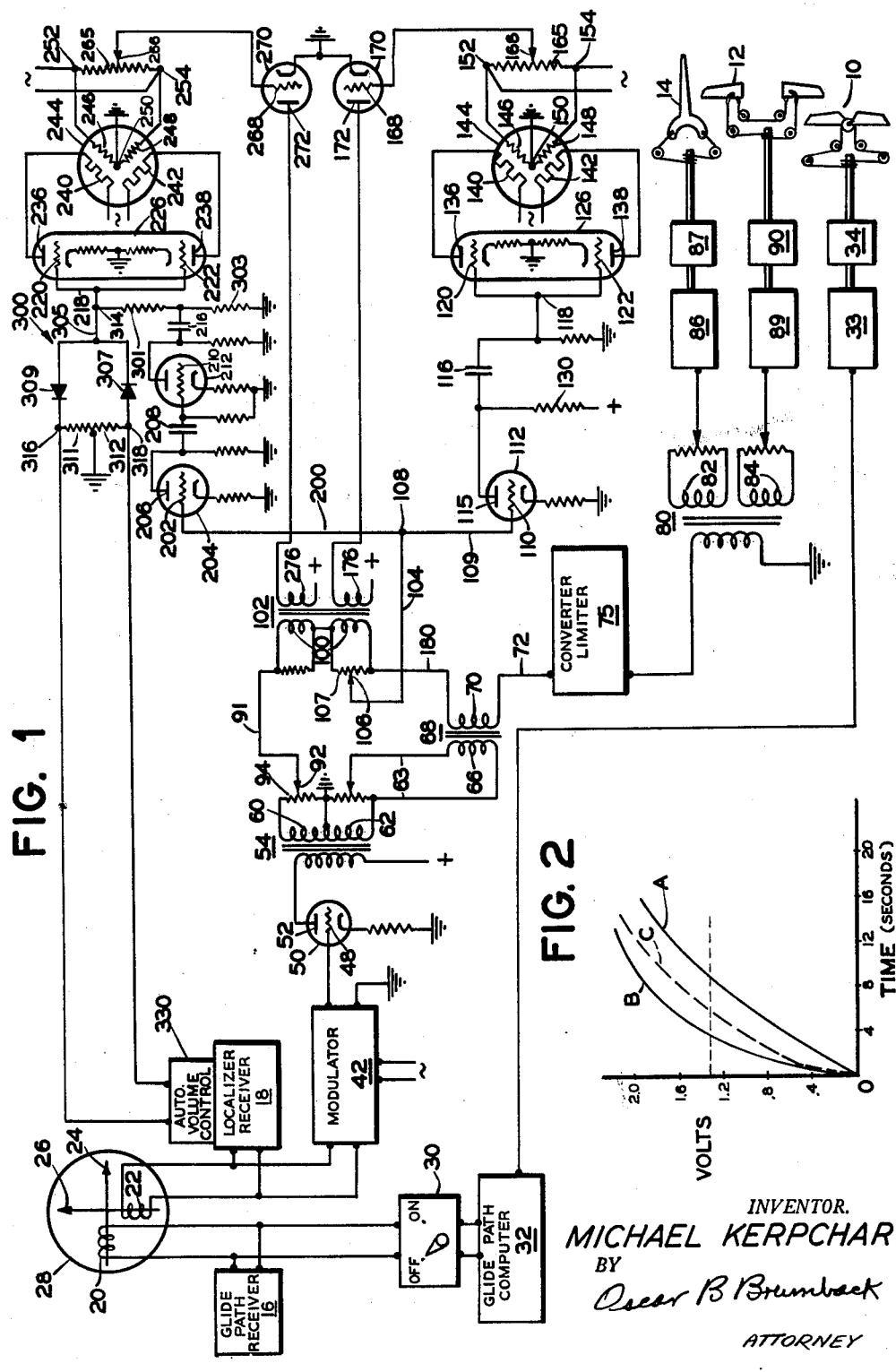
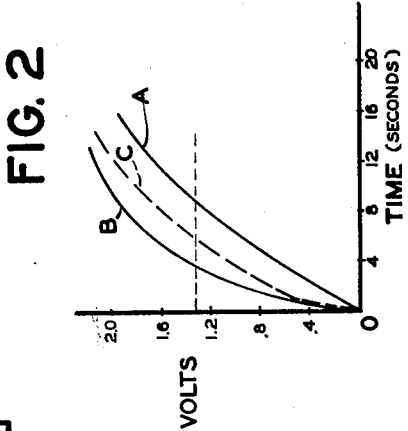
INVENTOR.
MICHAEL KERPCHAR
BY
Oscar B Brumback
ATTORNEY

United States Patent Office 2,926,294
Patented Feb. 23, 1960

2,926,294

VARIABLY DAMPED INSTRUMENT LANDING SERVOSYSTEM

Michael Kerpchar, Clifton, N.J., assignor to Bendix Aviation Corporation, Teterboro, N.J., a corporation of Delaware Application June 5, 1953, Serial No. 359,822

11 Claims. (Cl. 318—489)

This invention relates generally to control systems and more particularly to control systems utilizing variable damping means.

In presently used instrument landing systems, transmitters located at the landing strip to which the craft is heading radiate a beam pattern whose axis defines a line straight down the runway and out into space for some distance. A control system in the craft develops signals from this beam pattern to operate the control surfaces of the craft to keep it on the beam axis. Difficulty has been encountered, however, because the signal magnitude is determined by the angular displacement of the craft from the beam, the apex of the angle being at the radio transmitter. Since the linear distance from the craft to the beam axis for a given angular displacement decreases as the craft approaches the transmitter, a greater control signal is developed for a given linear distance of departure of the craft from the beam when the craft is near to the transmitter than when the craft is remote from it. The result is that the craft experiences as great a control action for a deviation of small linear distance from the beam when it is near the transmitter as it does for a greater deviation when it is remote from the transmitter. This causes the craft to hunt when it is near the transmitter.

The present invention overcomes the foregoing difficulty by automatically varying the damping of the control system as a function of the distance of the craft from the transmitter. The damping of the system increases as the craft approaches the transmitter so that the response of the craft to angular displacement signals of varying amplitude is substantially the same regardless of the distance of the craft from the transmitter.

An object of the present invention, therefore, is to provide a novel damping system for an automatic pilot wherein the damping response is continuously modified as a function of the distance of the craft from the transmitter.

Another object is to provide novel means to vary the damping of the servosystem as a function of some selected parameter.

A further object is to provide a novel rate deriving circuit wherein the time period constants during which the rate of change is measured may be selectively varied.

A still further object is to provide a novel damping circuit for servosystems that is capable of continuously variable damping rates.

The above and further objects and novel features of the invention will appear more fully from the following detailed description when the same is read in connection with the accompanying drawing. It is to be expressly understood, however, that the drawing is for the purpose of illustration only and is not intended to define the limits of the invention.

In the single sheet of drawing:

Figure 1 illustrates schematically one embodiment of the novel circuit of the present invention in operative association in an automatic pilot system; and Figure 2 shows typical curves for the thermal time delay elements employed in the novel circuit of Figure 1.

The novel variable rate circuit of the present invention is illustrated herein as a novel damping control operatively associated with an automatic pilot system which may be generally of the type described in U.S. Patent No. 2,592,173 issued April 8, 1953 to Paul A. Noxon et al.

Conventionally, the aircraft has elevator surfaces 10 for controlling the attitude of the craft about its pitch axis, ailerons surfaces 12 for controlling the craft about its roll axis, and rudder surfaces 14 for controlling the craft about its yaw axis.

Conventional instrument landing radio receivers 16 and 18 are also mounted on the craft.

The glide path beam of conventional instrument landing systems provides a reference for the craft in the vertical plane, and the localizer beam provides a reference in the horizontal plane. The transmitters for these beams are generally located at the landing strip to which the craft is heading. Radio receiver 16, receiving the glide path beam transmission, and radio receiver 18, receiving the localizer beam transmissions, develop direct current signals which represent the deviations of the craft from the respective beams. Coils 20 and 22, energized by a respective D.C. signal, position cross pointers 24 and 26 of indicator 28 to visually indicate the position of the craft with respect to the beams.

Radio receiver 16 is further connected through a suitable switch 30 to a glide path computer 32 which, when engaged, maintains the craft on the glide path beam by automatically controlling the operation of elevator surfaces 10 through servoamplifier 33 and servomotor 34. One such computer has been described in copending application Serial No. 202,552, filed December 23, 1950 and assigned to the assignee of the present invention.

Receiver 18 is further connected to a modulator 42 which, in response to the relatively weak direct current signal input, develops a workable alternating current signal output of varying phase and amplitude. A detailed description of one type of such modulator can be found in copending application Serial No. 700,234, filed September 30, 1946, now Patent No. 2,678,419, and assigned to the assignee of the present invention.

The output of modulator 42 is applied to the grid 48 of an amplifier 50, and the amplified signal from plate 52 is applied to a transformer 54. This transformer is the input to a rate deriving or damping circuit such as described and claimed in copending application Serial No. 90,236, filed April 28, 1949, now Patent No. 2,754,418 and assigned to the assignee of the present invention. Transformer 54 has two secondary windings: 60 and 62. The signal which appears on winding 60 develops a damping signal in a rate circuit and the signal which appears on winding 62 as the displacement signal controls the servomotors which operate the rudder and aileron.

To energize the servomotors by the displacement signal, leads 63 conduct the signal from secondary winding 62 to the primary winding 66 of a mixing transformer 68 where the signal is coupled to secondary winding 70 and by way of a lead 72 conducted to a converter limiter 75 which removes spurious components from the signal and limits its maximum value. The signal from converter limiter 75 is applied across a coupling transformer 80 to two secondary windings 82 and 84. The signal on secondary winding 82 through servoamplifier 86 energizes a servomotor 87 which operates rudder surface 14 to correct for the deviation of the aircraft from the beam; the signal from secondary winding 84 through a servoamplifier 89 energizes servomotor 90 which operates the aileron surfaces 12.

The details of the converter limiter are not included in the present specification since they have been fully described in copending application Serial No. 117,476, filed September 23, 1949, now abandoned. Also, the details of the servoamplifier and servomotors constituting the servosystem for the rudder, aileron and elevator surfaces are not included in this specification since they may be of the type described in U.S. Patent No. 2,625,348 issued January 13, 1953 to P. A. Noxon et al.

Were the displacement signal alone used to control the course of the craft, considerable hunting or oscillation of the craft about the beam axis would occur. To modify or dampen this oscillation, the signal which appears on secondary winding 60 of transformer 54 is fed through a rate deriving or "washout" circuit. The resulting rate signal from this circuit is mixed at transformer 68 with the displacement signal, and the algebraic sum of these signals ultimately controls the aileron and rudder surface.

To obtain a rate signal from the rate deriving circuit, a lead 91 conducts the signal from tap 92 of resistor 94 to the primary windings 100 of a feedback transformer 102. Lead 104 conducts the signal from tap 106 of resistor 107 to a junction 108 where a lead 109 conducts the signal onto the grid 110 of amplifier 112. The amplified signal from plate 115 of amplifier 112 is applied through a blocking condenser 116 to a lead 118 which connects the grids 120 and 122 of a conventional phase discriminator 126.

Plates 136 and 138 of discriminator 126 are, respectively, connected through the heater elements 140 and 142 of a thermal time delay device 144 to a suitable source of alternating curent. Thermal time delay device 144 may be of the type described in U.S. Patent No. 2,463,805 issued March 8, 1949 to Polye et al. wherein an evacuated glass tube encloses heaters 140 and 142 and resistors 146 and 148; the resistors and heaters being in heat exchange relationship.

The resistive network of thermal delay device 144 presents a normally balanced Wheatstone bridge; its four arms being resistor 146, resistor 148, the portion of resistor 165 above tap 166, and the portion of resistor 165 below tap 166. Alternating current is supplied to the junctions 152 and 154 defining one diagonal of the bridge while the output from tap 166 taken relative to ground defining the other diagonal.

The bias on grids 120 and 122 normally allows sufficient current through each triode section of discriminator 126 to warm heater elements 140 and 142 of device 144 to the midpoint of their usable temperature range. When a signal is applied to the discriminator tube, it operates as a selective switch responsive to the signal phase to determine in which heater 140 or 142 the greater current will flow. The change in resistance value caused by the change in temperature of the resistor upsets the balance of the bridge to develop a signal at tap 166. This signal is applied to the grid 168 of an amplifier tube 170, and the amplified signal from plate 172 is applied to a primary winding 176 of feedback transformer 102.

The signal from the rate circuit on winding 176 of transformer 102 is in phase opposition to the displacement signal on winding 100. Accordingly, when the displacement signal is of constant value, the signal from the rate circuit cancels the displacement signal. When the displacement signal is increasing, it is greater than the signal from the rate circuit. Conversely, when the displacement signal is decreasing, the signal from the rate circuit is greater.

Lead 180 conducts the resultant or rate signal from transformer 102 to the winding 70 of mixing transformer 68 where the signal is added algebraically to the displacement signal from secondary winding 62 of transformer 54. The combination of signals is passed through converter-limiter 75 and coupled across transformer 80, to energize the servomotors for rudder surfaces 14 and aileron surfaces 12.

The system so far described is known in the art, and has the disadvantage that its damping action is not sensitive to the change in distance of the craft from the transmitter because the time period of the thermal time delay tube 144 is constant. A signal of given value at the input transformer 54 requires a constant lapse of time before the signal at transformer 102 can be cancelled regardless of the distance of the craft from the transmitter. Therefore, while the automatic pilot system is imparting a sharper action to the surfaces in response to a given linear displacement from the beam when the craft is close to the transmitter than it does when the craft is further away from the transmitter, the damping action for the circuit remains at a constant value.

The novel arrangement of the present invention overcomes the foregoing disadvantage by increasing the rate of cancelling the displacement signal and consequently the damping action of the control system of the craft as it approaches the transmitter. The rate circuit portion of this novel arrangement is similar to the above described rate circuit of the automatic pilot system; the difference being that thermal time delay tube 244 has a delay period that is substantially shorter than that of tube 144. This circuit is connected to junction 108 by a lead 200 in parallel with the above described circuit. Thus, the same signal is applied to grid 110 of amplifier 112 and grid 202 of amplifier 204.

The amplified signal from plate 206 of amplifier 204 is conducted through blocking condenser 208 to the grid 210 of amplifier tube 212 for a second stage of amplification. The output from tube 212 is conducted through a blocking condenser 216 to a lead 218 which connects the grid 220 and 222 of a conventional phase discriminator 226. The plates 236 and 238 of this discriminator are connected through the heaters 240 and 242 of time delay tube 244 to a suitable source of alternating current.

In heat exchange relationship with heaters 240 and 242 are resistors 246 and 248 which are connected by a variable tapped resistor 265 to form a normally balanced Wheatstone bridge. Alternating current is supplied to the bridge at the diagonal defined by junctions 252 and 254, and the signal output derived from tap 266 is applied to the grid 268 of an amplifier 270. The amplified signal from plate 272 of amplifier 270 is applied to winding 276 of feedback transformer 102.

Displacement of the aircraft from the localizer beam develops at radio 18 a direct current signal whose magnitude corresponds to the extent and whose polarity depends upon the direction of departure from the beam. Modulator 42 responds to this signal and develops an alternating current signal whose phase corresponds to the polarity of the direct current signal and whose amplitude corresponds to the magnitude of the signal. This alternating current signal is amplified by amplifier 50, coupled across transformer 54, and by way of lead 91 is applied to primary windings 100.

Parallel connected leads 109 and 200 conduct the signal from junction 108 to the grid 110 of amplifier 112 and to the grid 202 of amplifier 204, respectively. After an interval of time, which is predetermined by the constants of delay tube 144, the signal which appears at winding 176 is in phase opposition to the signal input at winding 100 of transformer 102. However, after a lesser interval of time which is predetermined by the constants of delay tube 244, another signal in phase opposition has already appeared at winding 276. The two signals are added in series to oppose the signal input at primary winding 100.

A voltage limiter 300 is provided for the faster acting circuit with the lesser time delay period. To form this limiter, a resistor 301 is placed between blocking condenser 216 and lead 218, a second resistor 303 is placed between condenser 216 and resistor 301, and a lead 305 placed between the resistor 301 and lead 218 connects the latter through two rectifiers 307 and 309 with a suitable source of D.C. control potential which is grounded through resistors 311 and 312.

With voltage limiter 300 in the circuit, the signal potential beyond junction 314 cannot become greater than the potential at junction 316, such excess potential being short circuited through rectifier 309. Similarly, the potential beyond junction 314 cannot become less than the potential at 318 because it will similarly be short circuited.

Referring now to Figure 2, typical curves are shown for thermal time delay devices. As an illustration, curve A is for tube 144; curve B is for tube 244; and curve C is the resultant action of tubes 144 and 244 in a circuit such as the novel circuit described with tube 244 receiving only a portion of the excitation received by tube 144.

The time constant for these thermal delay tubes is generally considered the time required to cancel out sixty-three percent of the input. In the example, with an input of two volts the time constant of tube 144 from curve A would be 7.25 seconds, and the time constant for tube 244 from curve B with the same excitation would be 2 seconds. The effect of a measured excitation of tube 244 as shown by curve C is to raise the curve of the slow tube 144. Curve C shows for example that with an excitation of .4 volt to the fast tube 244 and 2 volts to the slow tube 144, the time constant has been changed from the 7.25 seconds for the slow tube above to 4.68 seconds. Thus, by varying the excitation of tube 244 the time constant may be changed between the limits of 2 seconds and 7.25 seconds.

It is clear, now, that the greater the potential appearing at junction 316 of limiter 300, the greater will be the signal from plates 236 or 238 of the discriminator 226. The greater the discriminator output, the more the heaters are heated, the greater the output at tap 266, and the sooner the input at winding 100 will be cancelled. Accordingly, increasing or decreasing the control potential at junctions 316 and 318 will control the rate at which the input signal at winding 100 is cancelled. When the rate signal is used to damp the control action of a servosystem, the damping action by the present invention is made a function of the control potential at junctions 316 and 318.

To obtain quicker damping action for the automatic pilot system as it approaches the transmitter, the control potential of the limiter at junctions 316 and 318 need only be controlled by some suitable device which will recognize the parameter of distance or position with respect to the transmitter. This device, for example, may be a conventional automatic volume control 330 on radio 18. By recognizing the change in the strength of the transmitter signal as craft approaches the landing strip, the automatic volume control 330 decreases the gain of radio 18 to maintain a constant volume level. Such a volume control may be suitably connected to vary the potential applied at junctions 316 and 318 to increase the signal strength to thermal time delay tube 244 thereby increasing the damping rate of the damping circuits as a function of a distance of the craft from the transmitter.

The foregoing has presented a novel means for increasing the rate of development of a damping signal for a servosystem. While only one embodiment has been illustrated and described, various changes may also be made in the design and arrangement of parts illustrated without departing from the spirit and scope of the invention, as will now be understood by those skilled in the art.

I claim:

1. In a system for automatically steering a vehicle toward a selected objective, said vehicle having a movable control surface thereon, a servomotor operatively associated with said surface for moving the latter, reference means on said vehicle for generating a reference signal proportional to the departure of said vehicle from a predetermined position, first means operatively associated with said reference means and responsive to said reference signal for reproducing the latter after a predetermined interval of time, second means operatively associated with said reference means and responsive to said reference signal for reproducing the latter after a predetermined interval of time, means associated with one of said reproducing means for modifying the reproduction time interval of said reference signal in accordance with a function of the position of said vehicle with respect to said objective, means for algebraically combining said signals wherein said delayed signals are in series opposition to said reference signal, and means connecting said combining means and said servomotor for controlling the latter.

2. In an automatic steering system for a vehicle having a movable control surface, a servomotor operatively associated with said surface for moving the latter, reference means for generating a reference signal proportional to the departure of said vehicle from a predetermined position, means for transmitting said signal from said reference means to said servomotor including means for modifying said signal as a function of the rate of change in signal strength during one period of time, means for modifying said signal as a function of the rate of change in signal strength during another period of time, and means for varying one of said time periods as a function of a parameter of the position of said vehicle.

3. In the control circuit of an automatic steering system for a vehicle, reference means on said vehicle for developing a reference signal proportional to the departure of said vehicle from a predetermined position, a first delay means operably associated with said reference means and responsive to said reference signal for developing a first delayed signal, a second delay means operably associated with said reference means and responsive to said reference signal for developing a second delayed signal, means connecting said reference means and said delay means for combining said delayed signals and reference signal to cancel out said reference signal upon the lapse of a predetermined interval of time after said reference signal becomes of constant value, and means associated with one of said delay means for selectively modifying one of said delayed signals.

4. A control circuit comprising an input adapted to be connected to a control signal source, a first time delay means connected to said input and operated in response to said control signal for developing after a predetermined interval of time a first delayed signal, a second time delay means connected to said input and operated in response to said control signal for developing after a predetermined interval of time a second delay signal, means connected to one of said time delay means for modifying the signal delay time in accordance with a selected variable, and means connecting said delay means and said input for feeding back said delayed signals to said input in opposition to said control signal.

5. In a servosystem having one element controlling another element by a command signal, a first circuit means connecting said elements for operating said another element in response to said command signal, a damping signal developing circuit connected with said first circuit and having an input for receiving said command signal and comprising means for reproducing said command signal after a delayed interval of time, means operably associated with said damping circuit for modifying said interval of time in accordance with a preselected variable, means for feeding the reproduced signal back to said input to oppose the command signal received by the damping circuit whereby said command signal will be cancelled when the command signal is of a constant value and not cancelled when said command signal is of a varying value, and means connecting said input to said first circuit for transmitting the sum of the command and feedback signal of said damping circuit to the command signal of said first circuit.

6. In a control circuit, the combination of reference means for developing a reference signal, first delay means associated with said reference means for developing a signal to cancel said reference signal after an interval of time, second delay means associated with said reference means for developing a signal to cancel said reference signal after a second interval of time, and means associated with one of said delay means for selectively modifying one of said time intervals.

7. In a system for automatically steering a vehicle toward a selected objective, said vehicle having a movable control surface thereon, a servomotor operatively associated with said surface for moving the latter, reference means for generating a reference signal proportional to the angular departure of said vehicle from prescribed course, the apex of the angle being at the objective, time delay means operably connected with the reference means for modifying said reference signal as a function of the rate of change in the amplitude of the reference signal, and means for generating a control signal proportional to the distance of the vehicle from said objective for regulating the delay period of said time delay means.

8. In a system for automatically steering a vehicle toward a selected objective, said vehicle having a movable control surface thereon, reference means for generating a control signal proportional to the angular displacement of said vehicle from a prescribed course, the apex of the angle being at the objective, a servomotor responsive to said reference signal and operatively connected with the control surface for moving the latter, means operatively connected with said reference means for cancelling out said reference signal upon lapse of a period of time after said reference signal becomes of constant value, means for generating a control signal proportional to the distance of the vehicle from said objective, and means responsive to said control signal for regulating the said time period.

9. In an automatic steering system for a vehicle having a movable control surface, a servomotor operatively associated with said surface for moving the latter, reference means for generating a signal proportional to departure of said vehicle from a predetermined position, means for transmitting said signal from said reference means to said servomotor including a time delay means for modifying said signal as a function of the rate of change in signal strength during a time delay period, and means for varying the time delay period as a function of a parameter of the position of said vehicle.

10. In a system for automatically steering a vehicle to a selected objective, said vehicle having a movable control surface, a servomotor operatively associated with said surface for moving the latter, reference means on said vehicle for generating a signal proportional to departure of said vehicle from a predetermined position, means for transmitting said signal from said reference means to said servomotor including means for modifying said signal as a function of the rate of change in signal strength during a predetermined period, and a means for varying said period as a function of distance of said vehicle from a selected objective.

11. In an automatic steering system for steering a vehicle toward a selected objective, said vehicle having a movable control surface, servomotor means associated with said surface for moving the latter, reference means for generating a reference signal proportional to the departure of said vehicle from a predetermined position, and means operably associated with said reference means and said servomotor for controlling the latter by said reference signal including means for cancelling said reference signal after it becomes of constant value for a predetermined interval of time, and means for modifying said time interval as a function of the position of the craft with respect to said selected objective.

References Cited in the file of this patent

UNITED STATES PATENTS

| | | |
|---|---|---|
| 2,432,036 | Noxon | Dec. 2, 1947 |
| 2,575,890 | Perkins | Nov. 20, 1951 |
| 2,734,703 | Markusen | Feb. 14, 1956 |
| 2,745,614 | Bennett et al. | May 15, 1956 |
| 2,759,137 | Kutzler | Aug. 14, 1956 |
| 2,775,420 | Bell | Dec. 25, 1956 |